United States Patent

[11] 3,561,316

| [72] | Inventor | Erich Karges |
| | | 6056 Heusenstamm, By Offenbach, Germany |
| [21] | Appl. No. | 734,376 |
| [22] | Filed | June 4, 1968 |
| [45] | Patented | Feb. 9, 1971 |

[54] QUICK-TIGHTENING SCREW
5 Claims, 4 Drawing Figs.

[52] U.S. Cl. .................................................. 85/7, 85/1, 85/32
[51] Int. Cl. .................................................. F16b 21/16
[50] Field of Search .......................................... 85/5.2, 7, 32K, 1 (Int.), 32 (Int.); 287/53 (TK)

[56] References Cited
UNITED STATES PATENTS

| 1,214,773 | 2/1917 | Gaining | 287/53TK |
| 1,413,280 | 4/1922 | Kengel | 287/53TK |
| 952,053 | 3/1910 | Tarleton | 85/7 |
| 974,059 | 10/1910 | Haynes | 85/1 Int. |
| 978,900 | 12/1910 | Kirkpatrick | 85/1 Int. |
| 1,062,212 | 5/1913 | Bechtel | 85/7 |
| 1,451,970 | 4/1923 | Taylor | 85/1 Int. |
| 1,633,295 | 6/1927 | Sutherland et al. | 85/32K |
| 1,809,553 | 6/1931 | Graul | 85/7 |

FOREIGN PATENTS

| 10,127 | 4/1913 | Great Britain | 85/7 |

*Primary Examiner*—Edward C. Allen
*Attorney*—Freeman & Taylor

ABSTRACT: A quick-tightening screw for holding work pieces in place on a work surface having T-slots.

The invention features a tensioning rod that has a flat surface disposed at right angles to a series of semicircular grooves. A two-piece securing nut is readily movable as a unit across the flat surface and when rotated at 90° has axially spaced tangential pins that become locked within the aforesaid grooves. Final clamping is done by rotation of the outer locking member that is threadingly engaged with the inner member of said two-piece nut.

3,561,316

QUICK-TIGHTENING SCREW

RELATED APPLICATIONS

Priority is claimed with respect to German Pat. application Ser. No. K 64 925 XII/47a, filed June 8, 1967.

BACKGROUND OF THE INVENTION

1. Field of the Invention

In the art of machining various parts to finished condition, it is oftentimes required that such parts be clamped in position so as to be fixed against movement during the ensuing machining operations. An improved clamp that is quickly positionable and releasable with respect to such work piece is the subject of this invention.

2. Description of the Prior Art

There are screw connections known which consist of a threaded spindle with at least two longitudinal grooves. The nut for this screw has also two longitudinal grooves so that the nut can be moved on the threaded spindle. The nut is also threaded on its outside diameter. A second nut is placed on this outside thread which is used for the tightening action. According to this arrangement, the two nuts, which are screwed into each other, are put on the threaded spindle and moved along the two longitudinal grooves up to the workpiece. When the nut is turned, the inside thread of the inner nut should engage with the outside thread of the threaded spindle and act as an axial locking device of the inner nut with the threaded bolt. When the inner nut is held after a short turn, the outer nut can then be tightened.

This screw connection has considerable disadvantages so that the practical applicability is doubtful.

Even on normal screws and nuts that have no longitudinal grooves, damages to the threads are clearly noticeable after they are tightened several times. The threads bend as a result of the pressure. However, when the screw and nut are weakened by longitudinal grooves by at least half of their load-bearing threads, then these screw connections can no longer be considered safe.

After the inner nut is put on the threaded spindle, the engaging of the threads for the purpose of the axial locking is difficult to accomplish. This is only possible when the threads of the inner nut are very accurately on the same level with the threads of the threaded spindle. If this is not watched, the threads can be damaged by the wrench when the nut is tightened.

The normal friction between the inner and the outer nut is not sufficient to turn the inner nut at the same time when the outer nut is turned and to effect an automatic locking with the threaded spindle. Therefore, the inner nut must be held by means of a wrench until the outer nut is tightened with a second wrench.

SUMMARY OF THE INVENTION

According to the present invention, a screw connection is to be created which eliminates these disadvantages and allows a tightening power equal to that of the normal screw connection at trouble-free operation.

Figure 1:
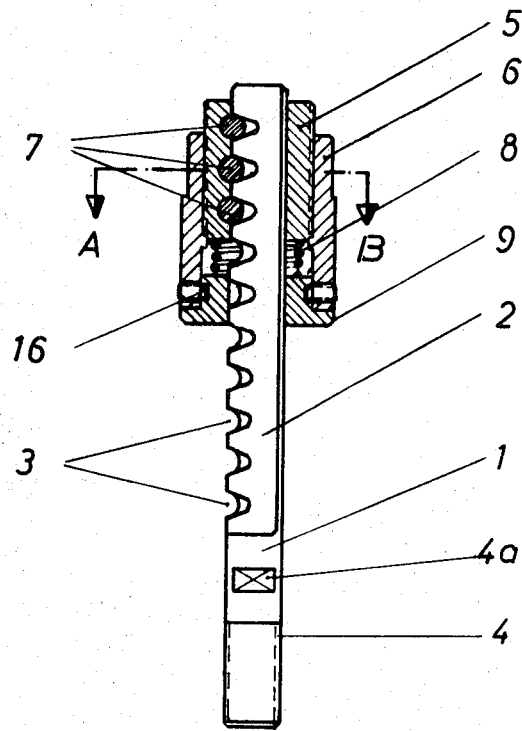
FIG. 1 is a vertical view of the improved screw partially broken away in section.
Figure 4:
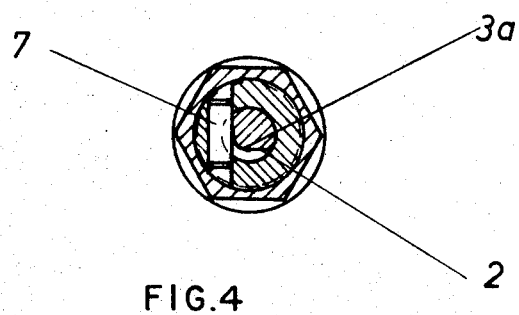
FIG. 4 is a sectional view taken on the lines A-B of FIG. 1.

The tension rod 1 has a surface 2 on the length of its tension area. At a right angle to that surface 2 there are grooves 3 provided in equal distances which are half round to maintain the strength of the tension rod. The edges 3a, resulting at the point where the grooves 3 change over into the surface 2, are rounded off. The tension rod 1 is hardened on the surface. This application example is provided with a thread 4 and a key face 4a instead of a screwhead of any desired shape. The length of the thread 4 is such that, when used as a tension screw in T-grooves, the tension rod 1 can be screwed through the grooved atone to the bottom of the T-groove and tightened by means of a wrench applied to the surface 4a. The female screw 5 is permanently screwed into the nut 6.

Tangential to the middle bore of the female screw 5, hardened pins 7 are pressed into the female screw in equal distances, like the grooves 3.

The radius of these pins 7 is somewhat smaller than the radius of the half round grooves 3.

When the nut 6 with the screwed-in female screw 5 is put on the tension rod 1, the pins 7 slide along the surface 2 to the workpiece. When the nut 6 is turned, the female screw 5 moves along the tension rod 1 until the pins 7 reach the level of the grooves 3 of the tension rod 1. During the continued turning, the nut 6 takes the female screw 5 forcibly along in the direction of rotation, due to the friction generated by the pressure spring so that the pins 7 automatically swing into the grooves 3. After a quarter turn, the pins 7 strike the bottom of the half round grooves 3 and, as a result of the tension pressure generated by continued turning, these pins bear also axially on that rounding of the grooves 3 which is in opposite direction to the tension pressure. Depending on the desired tensional force, one-quarter to three-quarters turn is required for the actual tightening action in addition to the quarter turn required for locking.

A smooth or stepless tension is attained by the fact that the utilizable bore of the female screw 5 is larger in the nut 6 than the distance between the grooves 3 in the tension rod 1 a plurality of pins 7 can engage the grooves.

The screw connection is loosened by an equally large motion in opposite direction to the tightening action. Immediately after the loosening of the tension, the pins 7 slide out of the grooves, due to the friction between the female screw 5 and the nut 6 generated by the pressure spring 8, and the nut 6 can be lifted off the tension rod 1. In order to avoid damages to the workpiece and to eliminate additional operations, a disc designed as a pressure disc 9 is rotatably connected by means of two stud screws which engage in the circumferential groove of the pressure disc 9. This pressure disc 9 serves also as a support for the pressure spring 8.

Figure 2:
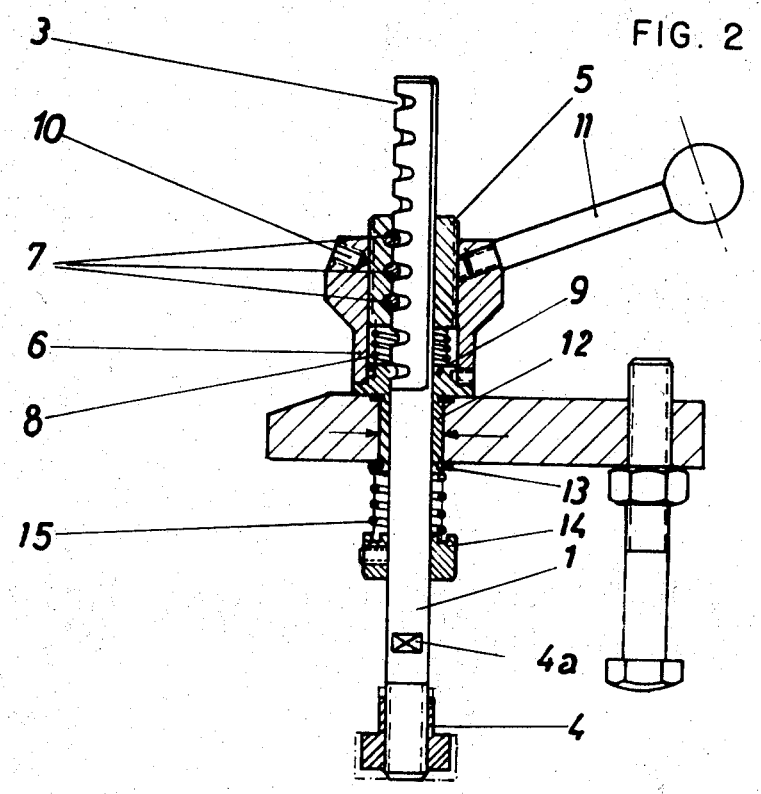
FIG. 2 is a view similar to FIG. 1 showing a modified form of the invention.

FIG. 2 shows another application example.

In place of key faces, the nut 6 has four tapped holes 10 which are uniformly distributed at the circumference. For the tightening without a wrench, either a tightening lever 11 can be inserted into each of these tapped holes, thus forming a star handle, or a single tightening lever 11 is screwed into any of the tapped holes 10. In this case, the pressure disc 9 is designed as a coupling. If a specially shaped tension element together with the nut 6 is to be put on the tension rod 1, this special tension element must have a bore into which the cylindric extension 12 of the pressure disc 9, designed as a coupling, will fit. This cylindric extension 12 must be also somewhat longer than the thickness of the tension element. The connection of these two parts in secured by a lock ring 13. The tension rod 1 has also a vertically adjustable pressure plate 14 which serves as a support for the pressure spring 15 and for adjusting the spring pressure. The effect of this additional pressure spring 15 is that the nut 6 together with the tension element is automatically lifted off the workpiece immediately after the tension is loosened.

Figure 3:
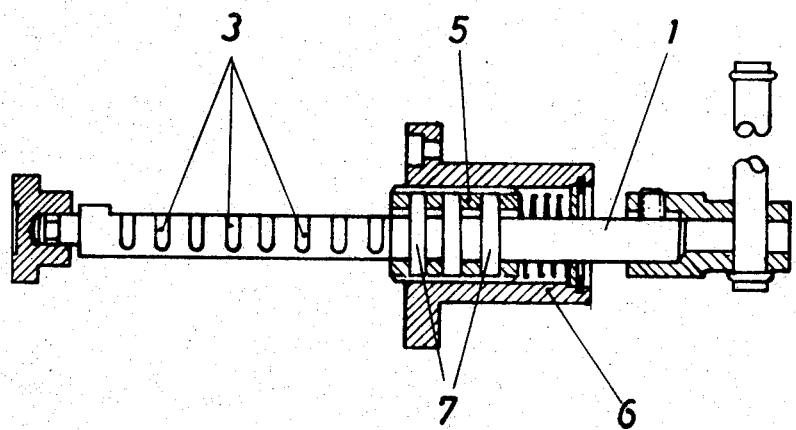
FIG. 3 is also a view similar to FIG. 1 showing a still further modified form of the invention.

FIG. 3 shows a tension rod 1 which is designed as a clamping bolt or pull spindle. This tension rod 1 can be freely moved axially to the workpiece through the female screw 5. When the tension rod 1 is turned during the tightening action, the pins 7 swing into the grooves 3 of the tension rod 1, the female screw 5 is moved along and turns in the thread of the nut 6 against the workpiece. The tightening pressure is loosened by turning in opposite direction, the pins 7 slide out of the grooves 3 and the tension rod 1 can be pulled back into the normal position. The front end of the tension rod 1 in the application example is designed for the rotatable fastening of a pressure piece. The rear end of the tension rod 1 has a transverse bore for the insertion of a tightening lever and also a hexagon head (or a square head) for the operation with a wrench.

The above-described tightening screw is simple and can be operated with one hand. The strong tightening forces that are generated with this screw, are securely picked up by the strong, reliable interlocking of the tension rod with the female screw, which is not accomplished at the expense of the stability of the tension rod or of the female screw, and these tightening forces are transmitted to the workpiece.

In practice, the tightening times are considerably shorter as compared to other known screw connections, since no additional operations are necessary except attaching and tightening and loosening and removing. The attached pressure disc (in FIG. 1) and the possibility to couple special tension elements with the nut (FIG. 2) eliminate additional operations which would otherwise be necessary.

A special advantage is the fact that all components in small and large dimensions can be produced without difficulties by means of normal tool-making machines.

I claim:

1. A quick-tightening screw of the character described, comprising:
   A. an elongate tension rod (1) having a flattened area (2) extending axially along at least a part of its length;
   B. a female screw (5) having a through central bore with a diameter greater than the diameter of said rod;
   C. a plurality of uniformly spaced pins (7) pressed into said female screw tangentially to said central bore thereof and adapted to freely pass axially of said tension rod along said flattened surface;
   D. a plurality of half round grooves (3) uniformly spaced from each other and disposed at right angles to said flattened area (2);
   E. said pins (7) being adapted to engage said grooves upon rotation of said female screw (5) whereby said screw and said rod are interlocked;
   F. a nut (6) adapted to threadingly engage said female screw (5); and
   G. a pressure spring (8) carried by said nut (6) and adapted to engage said female screw (5) whereby said pins (7) are forced into engagement with said grooves (3) upon rotation of said nut (6).

2. The device of claim 1 further characterized by the presence of a pressure disc (9) carried by said nut (6) and adapted to support said spring (8).

3. The device of claim 1 further characterized by the presence of:
   A. a pressure disc (9) carried by said nut (6) and having a cylindrical extension (12); and
   B. a tension element adapted to engage said cylindrical extension of said pressure disc.

4. The device of claim 3 further characterized by the presence of:
   A. a second pressure plate (14) telescoped over said pin (1); and
   B. a second pressure spring (15) interconnecting said cylindrical extension (12) and said plate (14).

5. A quick-tightening screw for use with a T-groove of the character described, comprising:
   A. an elongate tension rod (1) having a flattened area (2) extending axially from one end thereof along at least a portion of the length thereof;
   B. a female screw (5) having a through central bore with a diameter greater than the diameter of said rod;
   C. a plurality of uniformly spaced pins (7) pressed into said female screw tangentially to said central bore and adapted to freely pass axially along said flattened surface of said rod;
   D. said rod having a plurality of uniformly spaced, half round grooves (3) disposed at right angles to said flattened area (2);
   E. a nut (6) adapted to threadingly engage said female screw;
   F. said rod having its opposed end threaded (4) with said threads extending an axial distance greater than the thickness of said T-groove; and
   G. means carried by said rod for tightening said rod and said T-groove.